Sept. 27, 1932.  M. R. ANSTICE  1,879,008
VEGETABLE SLICING MACHINE
Filed March 31, 1930   3 Sheets-Sheet 3

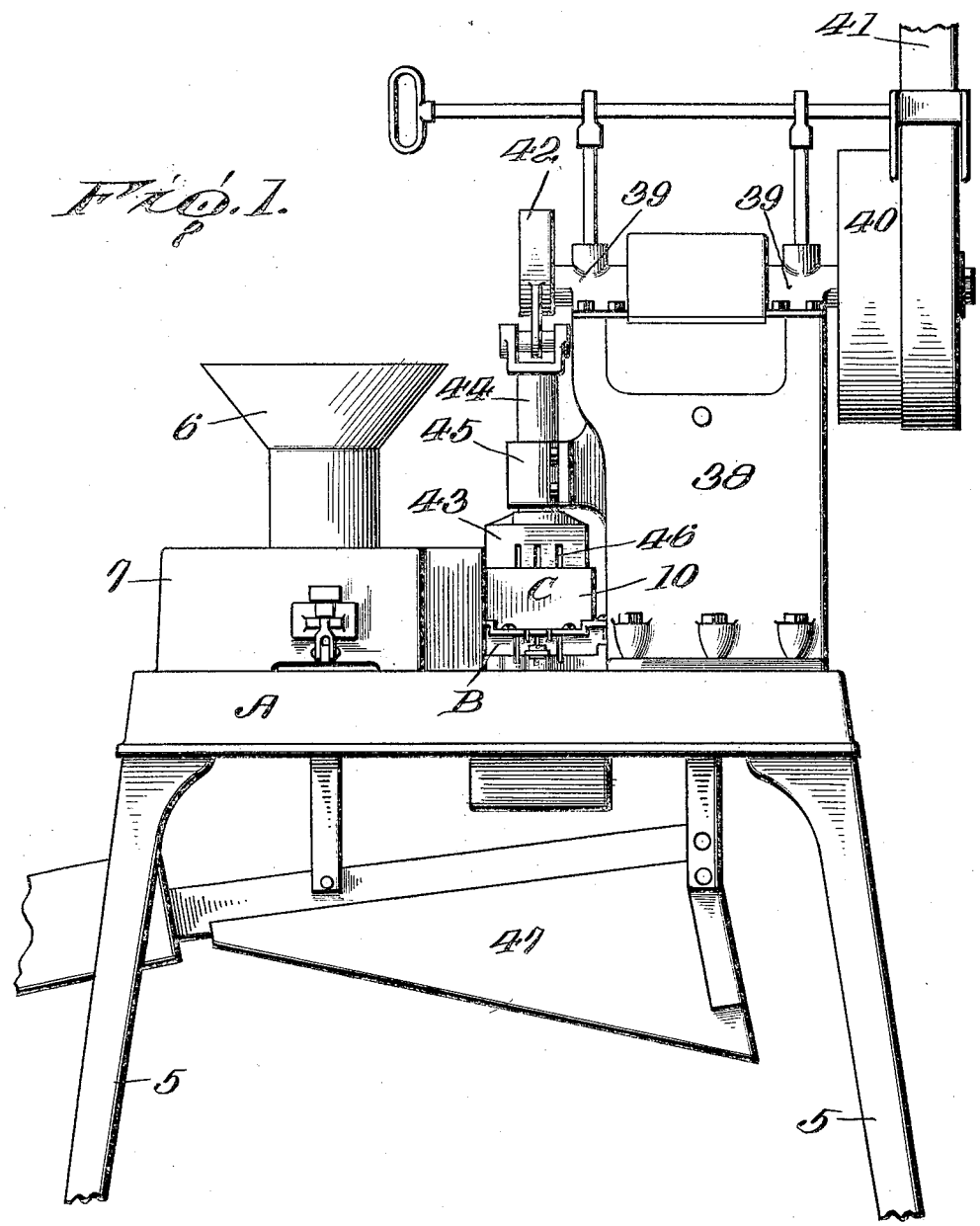

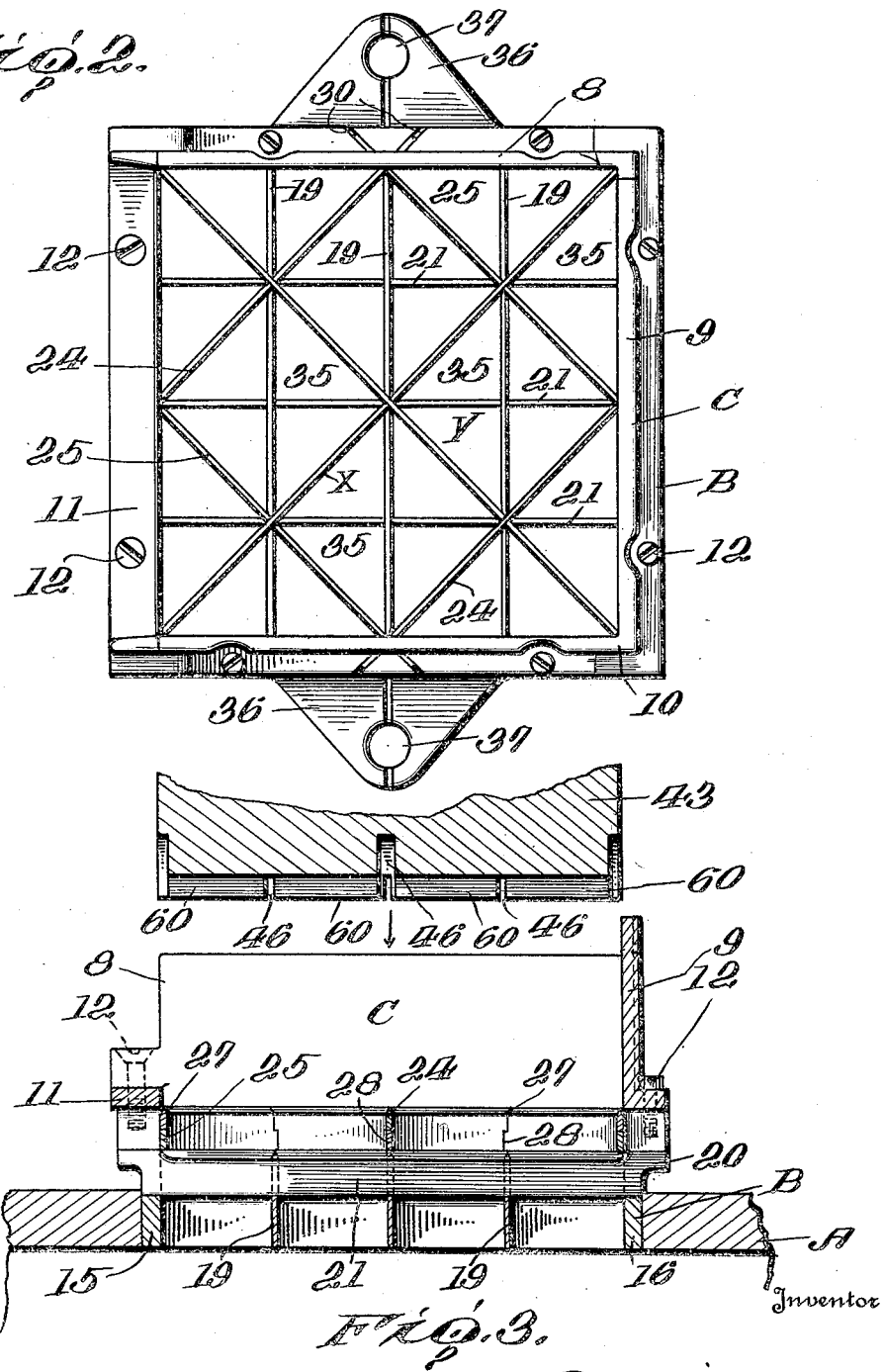

Patented Sept. 27, 1932

1,879,008

UNITED STATES PATENT OFFICE

MORTIMER R. ANSTICE, OF ROCHESTER, NEW YORK, ASSIGNOR TO JOSIAH ANSTICE & CO., INC., OF ROCHESTER, NEW YORK

VEGETABLE SLICING MACHINE

Application filed March 31, 1930. Serial No. 440,330.

This invention relates to improvements in vegetable slicing machines of the character wherein vegetables are first sliced approximately in half or into a series of strips and are later cut into a plurality of triangular shaped pieces of a configuration similar to the well-known slice of pie.

The present machine has been conceived and designed primarily for the slicing of beets, although it will be readily apparent that it can be utilized in slicing other vegetables without departing from the spirit of the invention. It is the usual practice to cut beets into a triangular shape and so far as I am aware this has been done heretofore by hand, whereas the present invention provides a means for rapidly cutting beets or other vegetables into a triangular shape by a machine the operation of which is accomplished by means of a new and novel arrangement of knives together with their coacting parts.

The primary object of the invention is the provision of a machine for cutting vegetables into triangular shapes.

Another object of the invention is the provision of a novel knife construction for cutting vegetables into triangular shapes.

A still further object of the invention is the provision of a novel form of knife construction for cutting vegetables into triangular shapes wherein the knives are used in conjunction with a plunger having a plurality of fingers and the construction being one whereby the cutting of the vegetables and the freeing of the vegetables from the knives and the knife box housing is accomplished by a short stroke of the plunger.

Other novel features of specific construction and improved results of the invention will be more specifically pointed out in the following description, the appended claims and the accompanying drawings.

In the drawings:

Figure 1 is a view in side elevation illustrating a vegetable slicing machine built in accordance with the present invention.

Fig. 2 is a top plan view of the knife box and the arrangement of knives therein.

Fig. 3 is a vertical sectional view through the knife box, a part of the plunger appearing in section thereabove.

Figure 4:
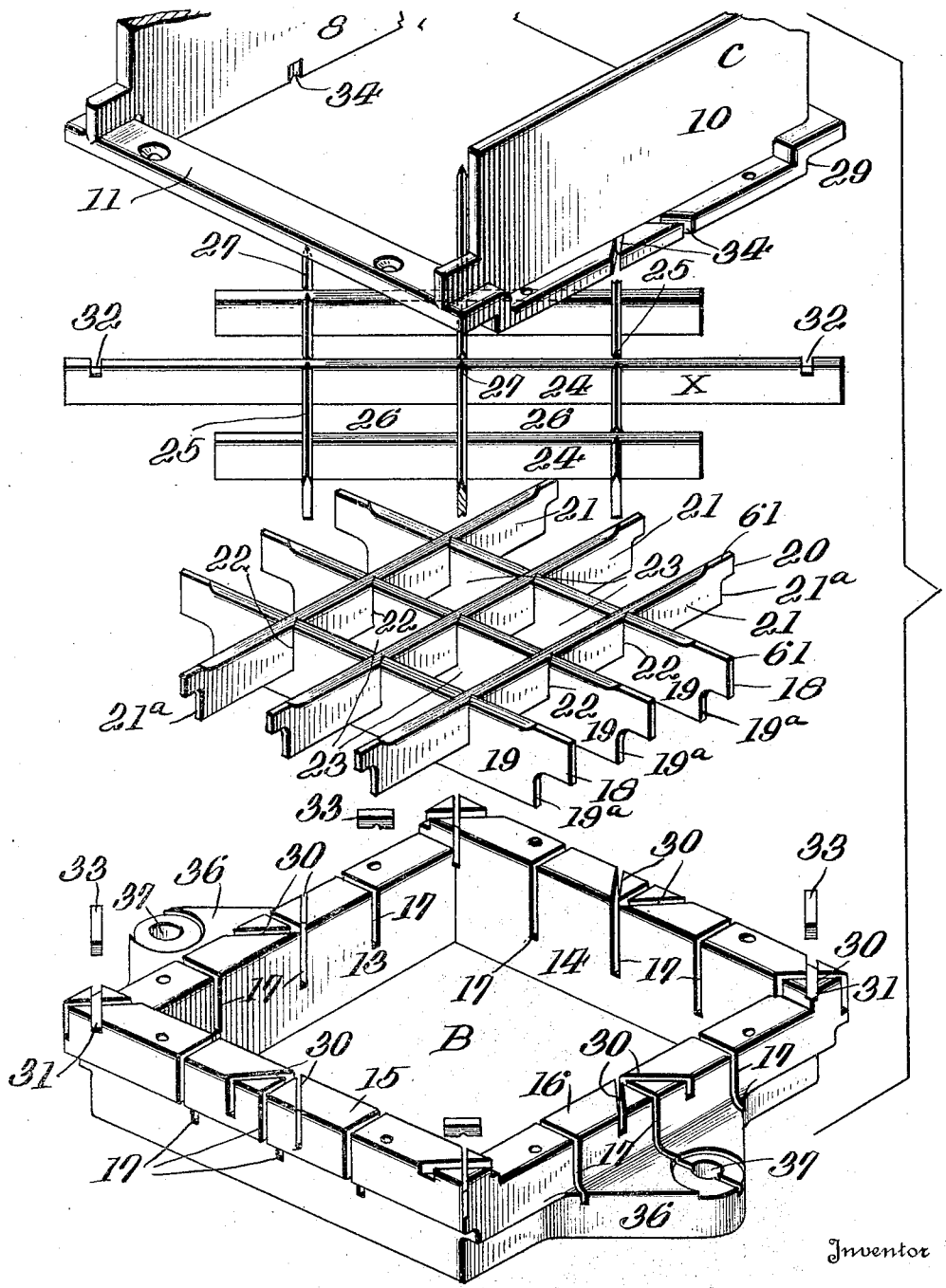
Fig. 4 is a strung-out perspective view showing the knife box and knives in unassembled relation.

Inasmuch as the slicing machine, other than the knife box, knives and plunger, is not new as a complete showing and disclosure appears in the Josiah Anstice Patent No. 1,357,829 of November 2nd, 1920, no more than would might be called a conventional showing of the main machine is made as will be apparent by reference to Fig. 1 of the drawings.

Consequently should any part of the machine construction other than the knives and plunger not be thoroughly understood from the following description, reference should be had to the above enumerated patent wherein the machine structure clearly appears.

Referring now to Figure 1 of the drawings it will be seen that the machine is built upon a base A supported in elevated position above the floor by legs 5. On one end of the machine there is mounted a hopper 6 into which the vegetables are deposited and conveyed to the mechanism enclosed within the housing 7. The mechanism within the housing 7 is one for cutting the vegetables in half or into a series of flat strips the thickness of which can be varied as desired so that from a single vegetable a plurality of strips could be sliced or the vegetable could be cut approximately in half.

By reference to the Anstice Patent No. 1,357,829 and particularly Figure 4 thereof, the construction of this slicing mechanism will be seen.

In respect to the present machine which is being described as operating upon beets, the slicing mechanism within the housing 7 is adjusted to cut the beets in half or slices of predetermined thickness and then deliver them to the knife box at a point above the knives.

By reference to Figures 2, 3, and 4 of the drawings it will be seen that the knife box comprises a main rectangular shaped housing 13 upon which is superimposed a secondary knife housing C having however only three enclosing walls, 8, 9 and 10, with the result that the side or end 11 of this secondary housing is open and it is intended that this end be adjacent the slicing mechanism previously referred to so that the sliced beets can be pushed or otherwise deposited upon the top of the knives to be sliced into triangular shapes in the manner hereinafter described. The secondary knife housing C is secured upon the upper edge of the main knife housing B through the medium of screws 12 or the like, although in the completed construction the knives are mounted entirely within the main knife housing and are assembled in their proper respective positions prior to the attachment of the supplemental housing.

By reference to Figure 4 it will be seen that each of the walls 13, 14, 15 and 16 of the main knife housing is provided with a series of spaced vertical knife receiving slits designated as 17 to receive the reduced ends 18 of a series of deep knife blades 19, and the reduced ends 20, of a series of shallow knife blades 21.

By reference to Figure 4 it will be seen that the series of deep blades 19 are provided with slits 22 which extend downwardly from their cutting edges a distance equal to the depth of the shallow cutting blades 21 and that the cutting blades 21 are mounted in these slits and that when so assembled there is provided a grid-like form of knives with the deep blades 19 extending in separated parallel relation and through these extend in a transverse direction the series of shallow blades 21 in separated parallel relation, and that when this grid is positioned in the main knife housing there is formed a series of hollow squares which in figure 4 are designated by the numeral 23. The knives just described might be termed the lower knives because above these knives in slightly separated relation thereto are positioned an upper set of knives arranged in two series of three blades each, designated as series by the numerals 24 and 25. These knives are of a depth substantially the same as the knife blades 21. The blades of one series have interlocking connection with the blades of the other series to position the blades 25 in separated parallel relation with the blades 24 extending in separated parallel relation transverse the blades 25 to form a series of squares 26.

This interlocking connection between the blades 24 and 25 is had by forming in the blades 25 vertical slits extending from the top of the blade half way through their depth and forming in the blades 24 vertical slits which extend from their bottom edges upwardly to a distance half their depth. The slits in the blades 25 are designated at 27 in Figures 3 and 4 of the drawings and the slots in the blades 24 appear at 28.

One of the blades 24 which is designated as X is much longer than the other two blades 24 and one blade which is designated as Y is much longer than the remaining two blades 25.

By reference to Figure 4 of the drawings it will be seen that the walls 13 and 16 of the lower knife housing are of less depth than the walls 14 and 15 of the housing, and to enable the supplemental housing C to seat properly upon the upper edges of the walls of the main knife housing B the lower ends of the walls 8 and 10 of the supplemental housing are offset as indicated at 29 so that these offset portions register with the depression caused by the short walls 13 and 16 of the main knife housing. By this construction there is an interlocking connection between the main and supplemental knife housings.

The grid formed by the assembled knives 24 and 25 is positioned in the main knife housing and secured in there by having the ends of these knives enter the obliquely arranged vertical slots 30 provided in the walls of the main housing and where the slots 30 are positioned in the corners of the housing a transverse keyway 31 is cut and the ends of the long blades X and Y are provided with keyways 32 to register with the keyways 31. Keys 33 are placed in these registering keyways with the result that the knife grid formed by the knife blades 24 and 25 is securely held in place within the main knife housing.

It will be of course apparent that due to the reduced height of the main knife housing walls 13 and 16 that the ends of the blades 24 and 25 when positioned in the oblique slots 30 of these walls will extend a distance above the walls or in other words, will be only embedded in the walls a distance approximately half their depth and to accommodate the extending portions of these knives above these walls 13 and 16 the depressed lower edges 29 of the walls 8 and 10 of the supplemental knife housing are provided with obliquely arranged slots 34.

By reference to Figure 2 of the drawings it will be seen that in the grid formed by the blades 24 and 25 these blades are spaced apart a distance one and one-half times as great as the spacing between the blades 19 and 21 with the result that the blades 24 and 25 intersect the blades 19 and 21 at the point where the blades 19 and 21 intersect themselves. The result of the above described positioning and arrangement of knives or blades is that the several blades will when a vegetable is pushed through them cut the vegetable into a plurality of triangular shapes, which triangular shapes are represented in Figure 2 by the series of triangular openings 35.

The main knife housing B is provided with cast ears 36 having bolt openings 37 by means of which the knife housing is readily attached to the base A of the machine.

From the foregoing description it will be seen that the knife housing carrying the series of knives is positioned adjacent the slicing mechanism within the housing 7 of the machine. Beyond the knives and their housing at the end of the machine, is provided a vertical standard 38 carrying in suitable bearings 39 a transversely extending shaft having at one end a pulley 40 adapted to be driven by a belt 41 or some other motive means, while its opposite end at a point above the knife housing is provided with an eccentric 42, from which is hung a plunger 43 by means of a plunger shaft 44 which is guided in a vertical bearing 45.

This plunger is the means for causing the vegetables to be pushed or forced downwardly through the several knives 24, 25, 19 and 21, and to accomplish this end the lower face of the plunger or pusher 43 is provided with a series of slots 46 so positioned as to register with and receive the several blades mounted in the knife housing.

An important feature of the knife contruction now comes to light, that being the fact that the lower knives 21 are of a depth only half as great as the lower knives 19 with the result that the pusher or plunger can cause the slicing or cutting of the vegetables into a triangular shape by traveling downwardly only to the bottom edges of the knives 21 and will at the same time cause the discharge of the cut vegetables from the knife housing into a suitable receptacle or conveyor which in Figure 1 is designated at 47 and positioned beneath the cutter housing.

In view of the above the deepest slot or groove 46 in the lower face of the plunger or pusher 43 is that of the combined depth of the blades 24 and 21 or the blades 26 and 21.

The knife construction by reason of the interlocking connection of the knives, is quite rigid and consequently durable, and the strength and rigidity of the knives is of course materially increased by the manner of fastening them in the main knife housing. By reason of the blades 21 being of reduced depth the plunger can cut the vegetables and discharge them by a much shorter stroke than would be possible were the blades 21 of a depth equal to the depth of the blades 19. This shortening of the stroke of the machine makes possible a speedy operation of the machine with an increase in production over what would be possible were all of the lower knives of a depth similar to the knives or blades 19. The reduction of the blades 19 to a depth substantially the same as the depth of the blade 21 would not answer the same purpose as the construction just described because then the knife structure would be materially weakened and would not have the strength and rigidity necessary to withstand the pressures and strains to which the knives are subjected.

When the supplemental knife housing C is in place the knives of the structure are additionally strengthened, the walls 8, 9 and 10 of this housing form a receptacle for the vegetables and at the same time form a guide and housing for the pusher or plunger when it descends. The vegetables once deposited upon the knives can not escape from the knives other than by being sliced in the triangular shapes and discharged from the bottom of the knife housing.

Experience has shown that if the knives are not rigid and not interlocked, strains force them apart and the finished product will not be cut in the form of a perfect triangle.

Lateral movement of the upper knives is prevented through the keys 33 and lateral movement of the lower knives if prevented by reason of the abutment of the shoulders $19^a$ of the cut out portion of the blades 19 with the interior surfaces of the side walls 13 and 16 of the rectangular knife housing. The cut out portions $21^a$ are provided in the narrow blades 21 to agree with the contour of the side walls 14 and 17 of the main knife housing to prevent the blades from penetrating outwardly beyond the outer faces of these side walls.

Although it is not considered to be of any particular importance, attention is called to the fact that the cutting edges of the several blades end short of the ends of the blade as indicated at 61.

Having thus described my invention what I claim and desire to secure by Letters Patent is:

1. In a vegetable cutting machine, a cutting mechanism for fashioning the vegetables into a plurality of triangular shapes comprising, a grid of blades intersecting one another at right angles to form a plurality of openings, a second grid of blades intersecting one another at right angles to form a plurality of openings, and said second grid of blades superimposed upon the first grid with the blades of the upper grid crossing the blades of the lower grids at the point of intersection of the blades of the lower grid, to form between the several grids of blades triangular shaped openings, and means to push the vegetables past the blades and through said openings.

2. In a vegetable cutting machine, a cutting mechanism for fashioning vegetables into a plurality of triangular shapes comprising, a grid of blades intersecting one another at right angles to form a plurality of openings, the blades forming two sides of each of said openings being of less depth than the blades forming the other two sides of the opening, a second grid of blades intersecting one another at right angles to form a plurality of openings, said second grid of blades superimposed on the first grid with the blades of the upper grid crossing the blades of the lower grid at the point of intersection of the blades of the lower grid, said several grids forming between them triangular shaped openings, and means to push the vegetables past the lower edges of the narrow blades of the lower grid, for the purpose described.

3. In a vegetable cutting machine, a knife housing comprising a rectangular frame the opposite sides of which are provided with vertically aligned and parallel knife receiving slots, a plurality of knives fitting into said slots and forming a grid with a plurality of rectangular shaped openings, the knives running transverse the frame in one direction being of a greater depth than the knives running transverse the housing the opposite direction, the cutting edges of said knives arranged in the same horizontal plane, the deep blades of the grid provided with reduced ends which engage the vertical slots at two sides of the housing with the ends of the blades beneath the reduced portions abutting the interior walls at the opposite sides of the housing, the opposite sides of said housing walls further provided with obliquely aligned slots, a grid of knives superimposed above the first mentioned grid of knives and having their ends arranged in said oblique slots, one of said oblique slots positioned across each of the four corners of the housing and provided with a transverse key-way, the ends of the blades in said oblique corner slots provided with a key-way registering with the slot key-way, and keys for said slot and blade key-ways to fasten the upper grid of blades against lateral movement.

4. In a vegetable cutting machine, a cutting and fashioning mechanism comprising an upper and a lower grid of blades mounted within a rectangular housing, the lower grid of blades intersecting and interlocking with one another to form a plurality of rectangular shaped openings with the cutting edges of the blades in the same plane, the blades forming two sides of each of said openings being of less depth than the blades forming the other two sides of said openings, the upper grid of blades comprising a plurality of blades intersecting and interlocked with one another to form a plurality of rectangular shaped openings of a size greater than the size formed by the lower grid of knives, said second grid of blades supported in said housing to cross the blades of the lower grid at the point of intersection of the blades of the lower grid to form between the several grids of blades triangular shaped openings, a plunger of a size to pass through said rectangular shaped housing and provided on its lower face with a plurality of slots forming a plurality of fingers of a size and shape to enter and register with the triangular shaped openings formed by the blade grids, and said fingers of a length equal to the combined depth of the blades of the upper grid and the shallow blades of the lower grid, and means to reciprocate said plunger to push the vegetables downwardly past the cutting edges of all of the blades and past the lower edge of the shallow blades of the lower grid.

5. In a vegetable cutting machine, a cutting and fashioning mechanism for fashioning the vegetables into a plurality of triangular shapes comprising, a grid of blades intersecting one another at right angles to form a plurality of openings, a second grid of blades intersecting one another at right angles to form a plurality of openings of twice the size of the openings formed by the first grid of blades, and said second grid of blades superimposed upon the first grid with the blades of the upper grid crossing the blades of the lower grid at the points of intersection of the blades of the lower grid, to form between the several grids of blades triangular shaped openings, for the purpose described.

6. In a vegetable cutting machine, a knife housing comprising a rectangular frame the opposite sides of which are provided with vertically aligned and parallel knife-receiving slots, a plurality of knives fitting into said slots and forming a grid with a plurality of rectangular shaped openings, the opposite sides of said housing walls further provided with obliquely aligned slots, and a grid of knives forming a plurality of rectangular shaped openings superimposed above the first mentioned grid of knives and having their ends arranged in said oblique slots.

7. In a vegetable machine a knife housing comprising a rectangular frame the opposite sides of which are provided with vertically aligned and parallel knife-receiving slots, a plurality of knives fitting into said slots and forming a grid with a plurality of rectangular-shaped openings, the opposite sides of said housing walls further provided with obliquely aligned slots, a grid of knives superimposed above the first-mentioned grid of knives and having their ends arranged in said oblique slots, a plurality of said oblique slots provided with a transverse key-way, the ends of said blades in said slots provided with a key-way registering with the slot key-ways, and keys for said slots and blade-key-ways to lock the upper grid of blades against lateral movement.

8. In a vegetable cutting machine, a knife housing comprising a rectangular frame the opposite sides of which are provided with vertically aligned and parallel knife-receiving slots, a plurality of knives having reduced ends fitting into said slots and forming a grid with a plurality of rectangular shaped openings, the ends of said knives back of said reduced portions engaging the rectangular frame beneath the slots and retaining the knives against lateral movement, the opposite sides of said housing frame further provided with obliquely aligned slots, a grid of knives superimposed above the first-mentioned grid of knives and having their ends arranged in said oblique slots, and keys for retaining said upper grid of blades in said oblique slots against lateral movement.

9. In a vegetable cutting machine, a cutting and fashioning mechanism comprising an upper and a lower grid of knives mounted within a rectangular housing, the lower grid of blades forming a plurality of rectangular-shaped openings, the blades forming two sides of each of said openings being of less depth than the blades forming the other two sides of said openings, the upper grid of blades forming a plurality of rectangular-shaped openings of a size greater than the size formed by the lower grid of knives, and said second grid of knives supported in said housing to cross the knives of the lower grid at the point of intersection of the knives of the lower grid to form between the several grids of knives triangular-shaped openings.

10. In a vegetable cutting machine, a knife housing comprising a rectangular frame the opposite sides of which are provided with vertically aligned and parallel knife-receiving slots, two oppositely disposed walls forming said frame of a less height than the other two walls of the frame, a plurality of knives fitting into said slots and forming a grid with a plurality of rectangular-shaped openings, the opposite walls of said housing further provided with obliquely aligned slots, a grid of knives superimposed above the first mentioned grid of knives and having their ends arranged in said oblique slots, the knife ends in the oblique slots of the shorter walls protruding above the ends of the slots and the top of said walls, a rectangular shaped supplemental knife housing superimposed above the main knife-housing and having depressed or offset portions adapted to rest upon the tops of the short walls of the main knife housing, and the said depressed portions of the supplemental knife housing provided with obliquely aligned slots to receive the portions of the knives extending above the short walls of the main knife housing.

In testimony whereof I hereunto affix my signature.

MORTIMER R. ANSTICE.